July 8, 1969  M. B. LAKE ET AL  3,453,767
FISH BITE INDICATOR
Filed Aug. 7, 1967
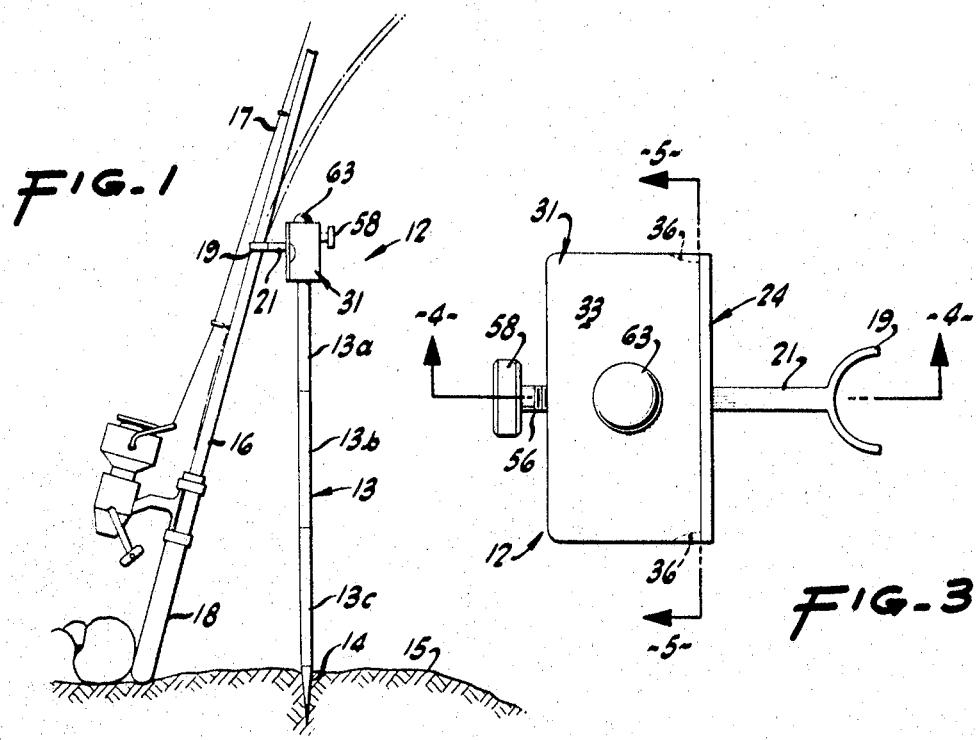
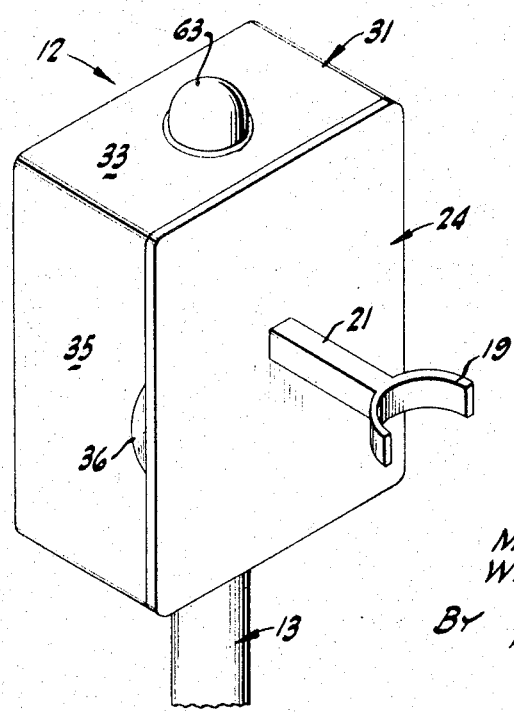
INVENTORS
MILBURN B. LAKE
WILLIAM R. HARRIS
BY Lothrop & West
ATTORNEYS July 8, 1969

M. B. LAKE ET AL 3,453,767

FISH BITE INDICATOR

Filed Aug. 7, 1967

INVENTORS
MILBURN B. LAKE
WILLIAM R. HARRIS

BY Lothrop & West

ATTORNEYS

United States Patent Office 3,453,767
Patented July 8, 1969

3,453,767
FISH BITE INDICATOR
Milburn B. Lake, 201 Rugosa Drive, Folsom, Calif. 95630, and William R. Harris, 430 Ashwood Court, Manteca, Calif. 95336
Filed Aug. 7, 1967, Ser. No. 658,883
Int. Cl. A01k 97/12
U.S. Cl. 43—17                                            2 Claims

ABSTRACT OF THE DISCLOSURE

A fishing pole with a baited hook in a nearby waterway leans against an actuator rod spring-biased away from an electrically energized contact connected to a visible or audible indicator member. A fish taking the bait bends the pole, thus overcoming the spring bias, closing the contact and actuating the indicator member.

---

The invention relates to improvements in devices for indicating to a fisherman that a fish is taking his bait.

Many fishermen, particularly when fishing is "slow," prefer to lean their fishing pole against a support and watch for signs that a fish is biting before lifting the pole.

The patent literature and the marketplace are replete with various kinds of apparatus for alerting a fisherman as to the state of affairs concerning his baited hook.

Some of these previous devices have been moderately expensive and bulky. Others have required that the fisherman continuously observe the indicator, the traditional bobber being an example of this type. Still others are not suitable for conditions of poor visibility, such as at night or in inclement weather, and respond to small nibbles in which the fisherman is often not interested.

It is therefore an object of the invention to provide a fish bite indicator which is compact, economical and reliable.

It is another object of the invention to provide a fish bite indicator which is rugged, durable and has but a minimum of moving parts to get out of order.

It is a further object of the invention to provide an indicator which can be used for night fishing and which affords a warning at a considerable distance.

It is still a further object of the invention to provide an indicator which is adjustable to suit the force exerted by fish of various sizes.

It is another object of the invention to provide a generally improved fish bite indicator.

Other objects, together with the foregoing, are attained in the embodiment described in the following description and shown in the accompanying drawings in which:

FIGURE 1 is a fragmentary side elevational view, to a reduced scale, showing the indicator in a typical environment;

FIGURE 2 is a fragmentary front perspective view;
FIGURE 3 is a top plan view;
FIGURE 4 is a fragmentary, median sectional view, the plane of the section being indicated by the line 4—4 in FIGURE 3; and
FIGURE 5 is a sectional view taken substantially on the line 5—5 in FIGURE 3.

While the fish bite indicator of the invention is susceptible of numerous physical embodiments, depending upon the environment and requirements of use, substantial numbers of the herein shown and described embodiment have been made, tested and used, and all have performed in an eminently satisfactory manner.

The fish bite indicator of the invention, generally designated by the reference numeral 12, is customarily mounted on the upper end of a post 13 having a lower end spike 14 inserted in the ground 15, such as on the bank of a waterway, not shown.

A fishing pole 16 with a line 17 leading to a baited hook, not shown, previously cast out into the waterway, is supported at its butt end 18 on the ground and leans against an arcuate fork 19 carried on the outer end of a horizontal actuator rod 21.

The actuator rod 21 is substantially square in section to prevent rotation; the rod, however, is translatable, being slidably disposed within a square in section channel 22 formed in a boss 23 carried on the inside of a removable cover plate 24.

The cover plate 24 is preferably of a slightly deformable plastic material, and at suitable intervals around its periphery carries a plurality of inwardly projecting arrow-heads 26 capable of being removably snapped into corresponding sockets 27 formed in the outwardly facing margins of a hollow casing 31, or housing.

More specifically, the housing comprises a back panel 32, a top panel 33, a bottom panel 34 and a pair of side panels 35.

The outwardly facing margins of the top panel 33, the bottom panel 34 and the side panels 35 are formed with sockets 27, as previously stated, capable of receiving the registering, snapped-in arrow-heads 26 on the cover plate 24.

In order to remove the cover plate when desired, a pair of fingertip recesses 36 are formed in the central outer corners of the side panels 35 (see FIGURES 2 and 5), enabling the user to pry off the cover plate 24.

Adjacent the inner, rounded end 41 of the actuator rod, there is provided a retaining member, such as an O-ring 42 disposed in a peripheral groove around the actuator rod. The retaining member 42 normally limits the extent of outward movement of the actuator rod 21 by reason of the abutment between the retainer 42 and the adjacent inner end of the boss 23. However, should it be desirable either for original shipment from the factory, or for storage within the casing 31, as appears in outline in FIGURE 5, it is only necessary to remove the cover plate 24, peel off the O-ring 42, withdraw the rod 21, replace the O-ring and lodge the rod 21 in the storage compartment 44, as shown in FIGURE 5.

The vertical post 13 is preferably made in sections 13a, 13b, and 13c in the interest of compactness, and can be made in a telescoping arrangement or a plurality of mutually engaging boss and socket joints held by friction.

In order to removably secure the housing 31 on the top of the post 13, the upper end boss 46 of the top section 13a is slightly tapered and affords a friction fit with the walls of a correspondingly tapered socket 47, or recess, in an upstanding block 48 formed in the bottom central portion of the housing.

The actuator rod 21 is urged axially inwardly by the weight of the fishing pole 16 leaning against the bifurcated member 19. This urgency is opposed by the outward biasing force exerted by a metallic leaf spring 51, or contact strip, mounted at its upper end by a screw 52 on the rear panel 32.

The lower end 53 of the spring-like contact strip 51 can be made to bias the actuator rod 21 outwardly not only by reason of the spring's inherent resiliency, but also by virtue of an adjustment screw 56 in threaded engagement with a tapped opening 57 in the rear panel 32. By suitably rotating the exposed screw knob 58, the effective biasing force of the spring 51 against the actuator rod 21 can be appropriately adjusted.

If, for example, the fisherman does not wish to have the indicator operate when small fish, such as minnows, bite on the bait, the spring bias can be increased by screwing in on the screw 56. In this event, only when a relatively large fish bites, causing the pole to deflect as indicated in outline in FIGURE 1, will the indicator become operative.

Substantial deflection of the pole pushes inwardly on the actuator rod 21, the supervening force being sufficient to overcome the opposing spring bias and to cause the lower end 53 of the spring to touch the lower contact button 61.

As this contact is made, the electrical circuit is completed and the indicator member, such as a lamp 62 within a transparent colored dome 63, is actuated. In some instances, an audible indicator, such as a buzzer, could also be used.

The electrical circuit is elementary and includes an electrical cell 66 having a first contact 67 connected by a conductor 68 to one lamp junction, and a second contact 71 connected by a conductor 72 to the lower contact screw 61. A short lead 73 connects the upper contact 52 to the other lamp junction.

As will be appreciated, the plastic material from which the housing and the actuator rod are fabricated are electrically non-conductive. Consequently, the electrical circuit is "open" until such time as a fish bite of sufficient effort takes place so as to urge the contact strip portion 53 against the contact button 61 and thus complete the circuit and actuate the warning member.

The cover plate 24 affords a substantially air-tight seal and the fit between the actuator rod 21 and its guideway 22 is also quite snug, the effect being to protect the interior components against the elements and the effects of corrosion even when the device is used on an ocean beach where salt air is present.

It can therefore be seen that we have provided a versatile, reliable and compact device for indicating from a distance, either by day or by night, the presence of a fish bite.

What is claimed is:

1. A fish bite indicator comprising:
 (a) a housing having a top panel, a bottom panel, a rear panel and a front opening;
 (b) a cover plate removably mounted on said housing to cover said opening;
 (c) an actuator rod translatably mounted on said cover plate for movement perpendicular thereto, said rod having a forked outer end to support a fish pole inclined thereon and an inner end within said housing;
 (d) a leaf spring mounted interiorly on said housing, said leaf spring biasing said inner end of said rod in an outward direction;
 (e) a battery in said housing;
 (f) a warning member on said housing; and,
 (g) electrical conductor means connected to said battery, said spring and said warning member for actuating said warning member as said rod is translated against the bias of said spring by a supervening force acting inwardly on said forked outer end of said rod, said electrical conductor means including an electrical contact on said rear panel located for engagement with said spring as said spring is biased inwardly by said supervening force.

2. The device of claim 1 including a vertical socket formed in said bottom panel, and a support post removably lodged in said socket, said post being insertable into the ground for positioning said housing at a desired height relative to the fishing pole.

References Cited

UNITED STATES PATENTS

| | | | |
|---|---|---|---|
| 2,745,088 | 5/1956 | Bauer | 43—17 X |
| 3,020,664 | 2/1962 | Snyder et al. | 43—17 |

SAMUEL KOREN, *Primary Examiner.*

D. J. LEACH, *Assistant Examiner.*